United States Patent [19]

Willinger et al.

[11] 4,315,143
[45] Feb. 9, 1982

[54] AQUARIUM HEATER

[76] Inventors: Allan H. Willinger, 351 E. 84th St., Apt. 21-E, New York, N.Y. 10028; Tsuyoshi Itakura, Itakura Soki Kabushiki Kaisha, 17-20 Unoki 3-Chome, Ohta-Ku, Tokyo, Japan

[21] Appl. No.: 201,138
[22] Filed: Oct. 27, 1980

Related U.S. Application Data

[62] Division of Ser. No. 63,049, Aug. 2, 1979, Pat. No. 4,255,648.

[51] Int. Cl.³ .................... H05B 3/80; H05B 1/02
[52] U.S. Cl. ............................ 219/523; 119/73; 219/330; 219/331; 219/489; 219/512; 219/530; 219/534; 219/544; 338/229
[58] Field of Search ............. 219/280, 328, 330, 331, 219/335, 489, 494, 498, 523, 530, 534, 540, 544, 505, 506, 510, 512; 119/5, 73; 338/225, 265, 301

[56] References Cited

U.S. PATENT DOCUMENTS

| | | | |
|---|---|---|---|
| 2,811,629 | 10/1957 | Danner | 219/523 |
| 3,107,289 | 10/1963 | Willinger | 219/489 |
| 3,107,290 | 10/1963 | Willinger | 219/494 |
| 3,564,589 | 2/1971 | Arak | 219/331 |
| 3,731,058 | 5/1973 | Blaiweiss | 219/280 |
| 3,746,836 | 7/1973 | Summerfield et al. | 219/328 |
| 4,163,145 | 7/1979 | Neff | 219/523 |

Primary Examiner—Volodymyr Y. Mayewsky
Attorney, Agent, or Firm—Friedman, Goodman & Teitelbaum

[57] ABSTRACT

An aquarium heater including a housing and a tube depending therefrom. An electric heating element is disposed in the bottom portion of the tube and a thermostatic control chassis is disposed in the upper portion of the tube. The control chassis includes two opposing housing sections matingly engaged in a nesting relationship to form a cylindrical housing unit which snugly fits into the tube and supports a bimetallic thermostatic switch together with associated circuitry and lead wires such that the thermostatic circuit elements are maintained securely positioned within the tube. The housing includes a gasket situated between a lip of the tube and the bottom wall of the housing, and a locking ring which clamps the rim of the tube in place. The tube is thereby held securely to the housing independently of the control chassis. A vertically slidable actuator arm engages a circular cam surface in the housing, where the cam surface converts rotary motion of a knob into vertical motion to thereby move the actuating arm. The lower end of the actuating arm engages and positions an adjustable contact member of the thermostatic switch to thereby maintain the temperature level of the heater as close as possible to a desired value.

11 Claims, 7 Drawing Figures

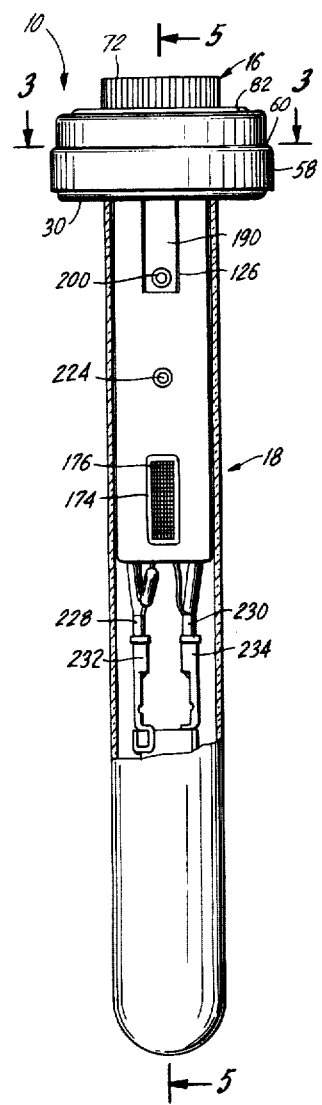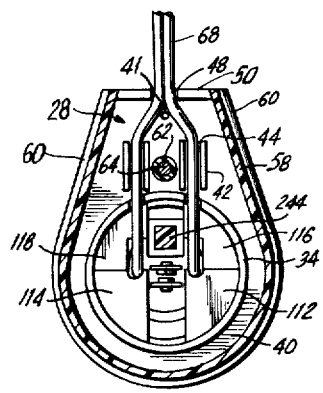
FIG.3
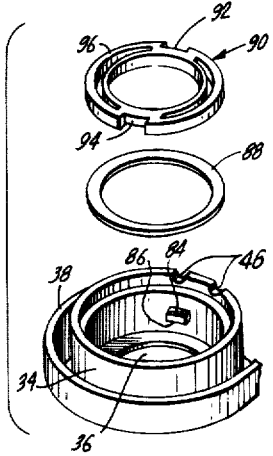
FIG.2    FIG.4 ions in accordance with the desired temperature level. As the surrounding temperature of the water changes, the bimetallic control members will move into and out of engagement with each other in order to open and close the circuit.

AQUARIUM HEATER

This is a division of application Ser. No. 63,049 filed Aug. 2, 1979 now U.S. Pat. No. 4,255,648.

BACKGROUND OF THE INVENTION

This invention relates to an aquarium heater and more particularly to a heater which can maintain its operation in a more accurate, efficient, and safe manner.

Aquarium heaters are generally utilized for maintaining a desired temperature level in aquarium tanks in order to provide a suitable environment for sustaining and propagating the fish contained in the tank. As a result, it is necessary to provide the heater with appropriate thermostatic means in order to sense the changing temperature in the tank and to thereby appropriately turn on and off the heater to maintain the temperature level as close as possible to the desired value. Normally, the aquarium heater is hung over the side of the tank by means of a housing, and the heating element is contained within a tube depending from the housing. Inside the tube is also contained an appropriate thermostat which senses the temperature. Typically, a bimetallic thermostatic switch is utilized, having a fixed and adjustable control member. The two control members are initially placed in appropriate contact position in accordance with the desired temperature level. As the surrounding temperature of the water changes, the bimetallic control members will move into and out of engagement with each other in order to open and close the circuit.

The heater is normally placed in the circuit and is turned on and off by means of the bimetallic switch. Usually, the heater is placed at the lower end of the tube and the bimetallic elements and other circuit members are contained in the upper part of the tube. The control of the temperature level is generally obtained by means of a control knob placed on the housing with indicia on the knob so that the desired temperature level can be selected externally of the aquarium tank.

In order to prevent arcing or pitting of the contacts, a capacitor is typically placed in parallel across the contact switch. Additionally, an indicator bulb, or the like, is generally included in parallel with the heating element to provide an indication when the heating element is turned on. Numerous heaters are described in the prior art. Typically, an aquarium heater is described in U.S. Pat. No. 3,731,058 which shows an aquarium heater of the type described and includes a unique heating coil arrangement which maintains uniform heating. Another prior art aquarium heater is described in U.S. Pat. No. 3,107,289 which again utilizes a basic structure similar to that described, and further includes two bimetallic switches in parallel in order to prevent freezing or sticking of the contact members of the first one of these switches.

While these and other aquarium heaters are generally in use, one of the problems with such heaters concerns the maintenance of the temperature level as close as possible to the desired value. The thermostat within the tube should monitor the temperature of the aquarium water and react to that temperature alone. However, since it is positioned in the tube adjacent to the heating element itself, it is also affected by such heating element. As a result, the heat reflected from the heating element is sensed by the thermostatic switch so that the switch may react to this increase in temperature and turn off the heating element, although actually, it is not the aquarium water that has risen in temperature, but it is only the effect from the heating element which has raised the temperature at the thermostatic switch. Therefore, in prior art heaters, there is more frequent turning on and off of the heater, and more difficulty in maintaining the temperature level of the aquarium water at the desired value. Additionally, the continued turning on and off of the bimetallic switch more than necessary, can cause premature carbonization and/or pitting of the switch contacts.

Additional problems with prior art devices concern th proper manufacture and maintenance of the device. Generally, the housing is formed of molded plastic which is manufactured to particular tolerances. The tube, typically of glass, is manufactured separately and also has its own broad tolerances. As a result, the spacing between the tube and the housing can vary between different aquarium heaters. With prior art devices, little, if anything, is done to accommodate such variations and accordingly problems of excessive heat leakage, water seepage from aeration bubbles, poor efficiency, and difficulty in maintenance is often encountered because of such variations.

A further problem of prior art devices concerns the specific construction whereby the control chassis supporting the thermostatic elements is frequently utilized to lock the housing onto the tube. For example, in U.S. Pat. No. 3,107,289, there are locking members on the control chassis which extend upwardly into the housing and are utilized for locking the various parts of the housing onto the tube. As a result, should movement of the tube occur, as for example during shipping and/or actual use, the control chassis together with the thermostatic elements will be jarred and invariably moved from their preset position. Likewise, various electrical leads, capacitor, indicator bulb, and other circuit components can also be displaced as the housing portion and the tube are slightly moved relative to each other. Such displacement can frequently occur during actual utilization of the aquarium heater as it is being installed on the aquarium tank. During such installation, manipulation of the housing with relation to the tube always occurs. With prior art devices, such manipulation will effect the control chassis and accordingly the thermostatic elements, which can permanently damage the aquarium heater. Also, even if it does not damage the heater, it may modify the present positioning of the contact members forming the thermostatic switch, whereby the initial setting on the control knob will no longer be accurate to the desired temperature setting and not infrequently can harm the fish by too great a temperature deviation.

Yet other problems with prior art devices concern the method and apparatus utilized for controlling the setting of the temperature level at the desired value. The most common device utilized for such control is a screw. For example, in the aforementioned patent, there is utilized an adjustable screw rotated by a control knob which bears against a bridge arrangement interconnecting the adjustable contact with respect to the fixed contact. Such screw arrangement can fail during continued utilization, where the screw or opposing threads can become stripped. Also, the screw can lock the bridge arrangement into place whereby it cannot be raised, and the temperature level may be thereby held at a critically dangerous high level. The threaded metal or plastic rod utilized as the screw in prior art aquarium heaters is not perfectly straight and therefore wobbles or turns eccentrically, creating a non-linear temperature range. Therefore, when the screw is turned to raise or lower the temperature slightly, the wobble acts in reverse. The screw arrangement has been a difficult one to maintain as well as utilize in order to provide accurate and efficient temperature setting.

SUMMARY OF THE INVENTION

Accordingly, it is an object of the present invention to provide an aquarium heater which avoids the aforementioned problems of the prior art devices.

A further object of the present invention is to provide an aquarium heater which includes a housing with a depending tube, a thermostatic circuit and a heating element being contained within the tube, whereby the thermostatic circuit is sufficiently separated from the heating element so as to minimize any effect thereby.

Still a further object of the present invention is to provide an aquarium heater having a housing with a tube depending therefrom, wherein the tube contains a control chassis supporting thermostatic elements and wherein the control chassis securely retains the thermostatic elements in place so that they cannot be jarred or moved from their position.

A further object of the present invention is to provide an aquarium heater having a housing with a depending tube, containing a thermostatic control chassis and heating element, and wherein the housing and the tube are coupled together independently of the control chassis.

Still a further object of the present invention is to provide an aquarium heater having a housing and a depending tube, with a thermostatic control chassis contained in the tube, and with a vertically slidable actuating arm engaging a bimetallic thermostatic element on the control chassis, to thereby adjust the desired temperature setting.

Yet another object of the present invention is to provide an aquarium heater having a housing and a depending tube, the tube containing a thermostatic control chassis and a heating element, and having a circular cam surface on the housing engaging a vertical slidable actuating arm on the control chassis, for adjusting the desired temperature setting of the heater.

Still a further object of the present invention is to provide an aquarium heater having a housing with a tube depending therefrom, and which includes clamping members to accommodate variations in the size of the tube and its lip as well as the manufacturing tolerances of the housing.

Yet a further object of the present invention is to provide an aquarium heater having a housing and a tube depending therefrom, with a control chassis in the tube wherein the control chassis is formed as two sections matingly engaged in nesting relationship to form a cylindrical unit snugly fitting within the tube and securely holding thermostatic control circuit elements therein.

The above objects are effected in accordance with the present invention by providing an aquarium heater having a housing and a tube depending therefrom. An electrical heating element and a thermostatic control chassis are disposed within the tube. The tube has a closed bottom and an open mouth surrounded by an outwardly extending peripheral lip. The housing includes a base portion and a cover portion in mating relationship. The base portion has a bottom wall and a perimetric upstanding side wall surrounding the bottom wall. The bottom wall includes an aperture through which the tube extends. A gasket surrounds the tube and is interposed between the peripheral lip and the bottom wall. A locking ring fits within the upstanding side wall and clamps the lip of the tube against the gasket whereby the tube is retained in the housing independently of the control chassis.

One type of locking ring that is described includes a keyway which receives a corresponding key located on the perimetric side wall of the base portion. A tapered facing relationship exists between the key and the surface of the locking ring to provide a wedging action therebetween.

In the present invention, the heating element is disposed at the bottom portion of the tube and the thermostatic control chassis is disposed in the upper portion of the tube. The control chassis comprises two opposing sections matingly engaged in nesting relationship to form a cylindrical unit which snugly fits within the tube. The cylindrical unit includes a base wall transversely separating the bottom portion of the tube from the rest of the control chassis. Bimetallic thermostatic switch means are securely mounted within the cylindrical unit in circuit with the heating element. Other circuit elements are likewise retained securely in the control chassis in fixed position. An adjustment means on the housing is provided for adjusting the position of the switch means to thereby control the temperature setting of the heater.

The adjustment means includes an actuator arm vertically slidable within the control chassis and extending upwardly into the housing. A control knob having a cam surface thereunder is provided for converting rotational movement of the control knob into vertical sliding movement of the actuator arm. The actuator arm bears against an adjustable contact member of the bimetallic switch means and adjusts the relative position of the contact members for the desired temperature value.

BRIEF DESCRIPTION OF THE DRAWINGS

With the above and additional objects and advantages in view, as will hereinafter appear, this invention comprises the devices, combinations, and arrangements of parts hereinafter described and illustrated in the accompanying drawings of a preferred embodiment in which:

FIG. 2 is a partially cut away front elevational view;

FIG. 3 is a sectional view taken along line 3—3 of FIG. 2;

FIG. 4 is an exploded view of the parts of the base portion of the housing;

In the various figures of the drawing, like reference characters designate like parts.

DETAILED DESCRIPTION OF THE PREFERRED EMBODIMENT

Figure 1:
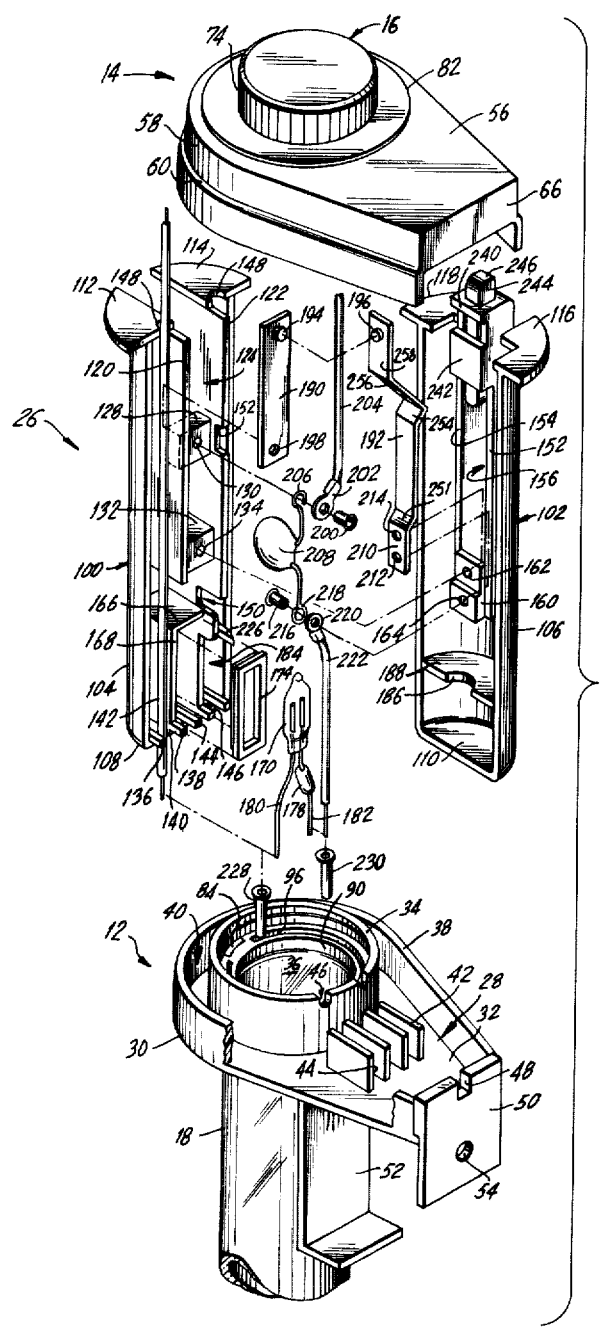
FIG. 1 is an exploded view of the aquarium heater in accordance with the present invention.
Figures 5, 6, 7:
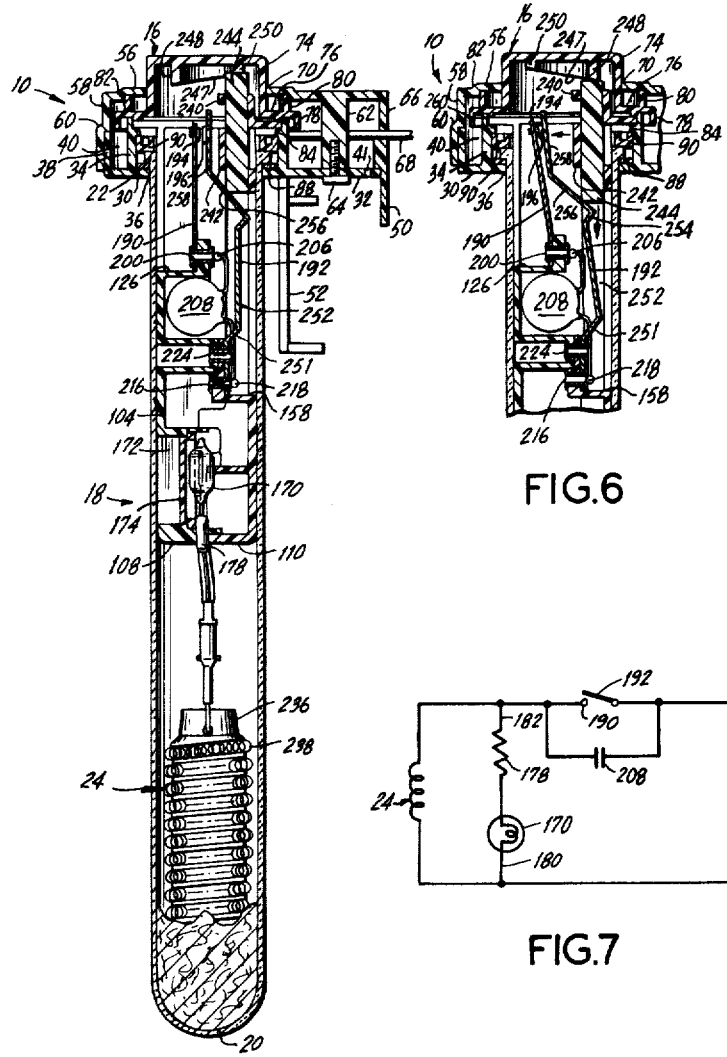
FIG. 5 is a sectional view taken along line 5—5 of FIG. 2, and showing the bimetallic switch in a first position.
FIG. 6 is a fragmented view similar to that of FIG. 5, showing the bimetallic switch in a second position.
FIG. 7 is a schematic circuit drawing of the electrical system of the aquarium heater.

Referring now to the drawings, and particularly to FIGS. 1, 2 and 5, the aquarium heater is shown to include a housing, shown generally at 10, and comprising a base portion, shown generally at 12, and a cover portion, shown generally at 14, including a cap member 16. Downwardly depending from the housing 10 is a tube, shown generally at 18, having a cylindrical configuration with a closed U-shaped bottom 20 and an open top. An outwardly directed peripheral lip 22 surrounds the open top. Disposed within the tube, and particularly in the lower portion thereof, is a heating element 24 electrically connected to a thermostatic control chassis, shown generally at 26, positioned in the upper portion of the tube.

The base portion 12 of the housing can best be seen with reference to FIGS. 1, 4 and 5. Such base portion 12 includes a bottom wall 28 having a circular section 30 with a laterally extending section 32. On the circular section 30 of the bottom wall 28 is a perimetric upstanding side wall 34 surrounding an aperture 36 provided in the bottom wall from which depends the tube 18. An upstanding perimetric outer side wall 38 is spaced from and surrounds the perimetric side wall 34. The two perimetric walls 34, 38 and the portion of the bottom wall 28 between the two perimetric walls provides a moat section or recess 40 which can receive leakage water, as will be described hereinafter. The perimetric side wall 34 terminates in a plane slightly above the perimetric outer side wall 38. The outer side wall 38 is formed proximate the outer edge of the circular section 30 and the opposite side edges of the section 32 of the bottom wall 28.

Provided on the laterally extending section 32 of the bottom wall 28 are upstanding separating walls 42 defining passageways 44 therebetween, through which lead wires may extend. Notches 46 are provided at the upper edge of the perimetric side wall 34 to receive the lead wires extending upwardly from the control chassis contained within the tube 18. Two such notches 46 are provided corresponding to the two lead wires. These wires then pass through the passageways 44 and are positioned together for passage through a single notch 48 provided in a rear flange 50 on section 32. The flange 50 is positioned perpendicular to the bottom wall 28 and against the opposite ends of the side wall 38. The flange 50 in conjunction with a depending L-shaped member 52 provides the clamping mechanism for securing the aquarium heater to a side wall of the aquarium tank. An aperture 54 is provided in the flange 50 to accommodate a locking screw (not shown) for retaining the aquarium heater in place on the aquarium tank wall.

The cover portion 14 includes a top wall 56 which is correspondingly shaped to fit over the bottom wall 28 of the base portion 12 of the housing. Downwardly depending side walls 58 extend from the top wall and are formed with a stepped section 60. The stepped section 60 fits over the upper edge of the outer perimetric side wall 38 and sits upon it. A downwardly depending internal post 62 is integrally formed with the top wall 56. The post 62 sits on the laterally extending portion 32 of the bottom wall 28 of the base portion, and receives therein a clamping screw 64 for securely retaining the cover portion onto the base portion and completing the housing. A rear portion 66 of the cover member 14 is positioned to lie on the upper edge of the flange 50 to define a rear wall. The lead wire 68 passes under the rear portion 66 and in the notch 48 provided in the flange 50 of the rear wall, as shown in FIG. 3.

An aperture 70 is provided in the top wall 56 of the cover portion and receives therein the cap member 16. The cap member includes a circular knob 72 having knurled or spleened periphery side walls 74 to permit grasping for rotation of the knob. Graduations can be formed on the knob, and an index marker can be formed on the cover portion, which together can be calibrated to read appropriate temperature level settings.

The downwardly depending side walls 74 of the knob terminate in an outwardly extending flanged portion 76 which in turn terminates with a downwardly depending rim 78. The outwardly extending flanged portion 76 sits on the upper edge of the perimetric side wall 34 and is maintained situated below the top wall 56 of the cover portion by means of the upwardly extending retaining wall 80 of the flange portion 76. A step 82 is provided in the top wall 56 for seating and holding the retaining wall 80.

With the position as shown, the downwardly depending rim 78 extends into the moat section 40. This provides a safety feature for the apparatus. Under normal operation, only the downwardly depending tube 18 is positioned within the aquarium water. The housing 10 is normally maintained above the water level. However, it may accidentally occur that the housing itself may become splashed or water may be accidently poured over it. Any water which seeps into the housing, and specifically from around the rotating cap member 16, will be directed by means of the outwardly extending flange 76 and the downwardly depending rim 78 into the moat section 40 where the water will drain off through hole 41 in the bottom wall 28, best shown in FIG. 3. This will prevent water seepage into the tube 18 where it might damage the electrical components and possibly cause electrical failure of the device.

The downwardly depending tube 18 is clamped to the housing by means of a clamping mechanism best seen in FIGS. 4 and 5. At least two inwardly projecting keys 84 are provided spaced around the inside surface of the perimetric side wall 34. The lower surface 86 of each key is downwardly tapered. A circular washer, O-ring or gasket 88 is provided for positioning beneath the lip of the tube 18, and a clamping or locking ring 90 is utilized for clamping the tube to the housing. The locking ring includes keyways 92, 94 in the outer periphery thereof and circular relief grooves 96 provided in the upper surface.

In assembly, as can best be seen in FIG. 5, the washer or gasket 88 is placed around the periphery of the tube and abuts the underside of the outwardly extending tube lip 22. The tube is then inserted in the aperture 36 in the bottom wall 28 at the circular section 30 of the base portion 12 so that the gasket lies on this bottom wall. The locking ring 90 is then inserted into the aperture 36 so that the keyways 92, 94 receive and bypass the keys 84, and the locking ring is then turned. Because of the tapered lower surfaces 86 of the keys, as the locking ring is turned under the keys 84, a wedging action takes place along the upper surfaces of the locking ring whereby it tightly clamps the lip of the tube against the gasket and retains it within the base portion.

Although the above wedging action was shown as having the lower surface of the keys tapered, it is understood that alternativley the upper surface of the locking ring could be likewise tapered with the lower surface of the keys not being tapered. Additionally, in place of the key and keyway arrangement, the locking ring could be screwed into place by having an internally threaded surface provided in the perimetric sidewall 34, and having an externally threaded perimeter provided about the locking ring.

By means of the clamping arrangement described above, it will be appreciated that the tube depends from the housing and is clamped to the housing without any association with or without the assistance of the thermostatic control chassis. Accordingly, should there be any relative movement between the tube and the housing, it will not cause the thermostatic elements to become dislodged, jarred, or displaced from their independent position within the tube. Additionally, by means of the gasket arrangement, numerous variations in size, resulting from tolerance limitations, can be accommodated. Thus, any variations in size in the tube itself, particularly the lip size, will be compensated by means of the gasket whereby a tight fit will still be provided between the housing and the tube to support the tube and to prevent seepage of water therein.

It should be appreciated, in this regard, that normally the gasket would be assumed to be placed beneath the locking member 90 so that the locking member clamps against the gasket. However, by placing it on the underside of the lip, and specifically between the lip and the bottom wall 28 of the base portion 12, a supporting seal is provided between the lip and the bottom wall which compensates for any variation that may occur during manufacture, particularly the manufacture of the tube within given tolerance limits. Aeration of the water in the aquarium gives rise to bubbles popping at the surface which would wet and infiltrate through this point so that the seal serves a dual purpose.

The control chassis 26 is formed of opposing housing sections 100 and 102. Each housing section is of a semicylindrical shape comprising respective outer walls 104, 106, respective semicircular bottom walls 108, 110, and respective upper flange sections 112, 114, and 116, 118.

The two housing sections matingly engage with each other in nesting relationship to form a composite cylindrical housing unit whose outer wall snugly fits within the tube 18. As will hereinafter be explained, the various thermostatic circuit elements are all maintained within this cylindrical housing unit in fixed relationship therein. Because of this snug fit, there will be avoided the jarring of the various thermostatic circuit elements within the tube, and once preset, these circuit elements will be maintained in appropriate desired position.

The two semicircular bottom sections 108, 110, also interfit to form a total bottom wall which separates the heating element 24 from the thermostatic circuit elements as shown in FIG. 5. In this way the thermostatic circuit elements, and particularly the bimetallic switch, will insufficiently be affected by the heating element in the bottom portion of the tube and will only be affected by the temperature of the surrounding water.

Contained within the housing section 100 are inwardly directed, longitudinally extending spacer walls 120, 122, defining therebetween a channel portion 124. An opening 126 is formed in the outer wall 104 of this housing section commensurate with at least a portion of the channel 124, as can best be seen in FIG. 2. Positioned along the channel is a first mounting pad 128 which includes therein a rivet hole 130. Further therebeneath, is an additional mounting pad 132 also containing a rivet hole 134.

On the side of each spacer wall 120, 122 are provided guideways for receiving therein lead wires. Against the bottom wall 108 are provided the guide posts 136, 138 defining the space 140 therebetween for receiving the lead wire 142 as it passes beneath the bottom wall. On the other side of the spacer wall 122 are provided additional guide posts for permitting passage of another lead wire on the other side thereof. An additional center guide post 144 is provided for defining guideways on either side to receive the wires going to the bulb. Notches 146 are formed in opposite portions of the bottom wall to permit passage therethrough of the lead wires. Corresponding notches 148 are also provided on each of the top sections 112, 114 to permit entry of the lead wires therein. Appropriate recesses or slots 150, 152 are formed in the spacer wall 122 to permit threading of the lead wires therethrough so as to bring the lead wires from the outer guideways into the channel 124 for appropriate electrical connection to the bimetallic switch members.

In the other housing section 102 are also formed longitudinally extending spacer walls 152, 154, defining therebetween the channel 156. An opening 158, shown in FIG. 5, is formed in the outer wall 106 of this housing member permitting access to at least a greater portion of the channel 156. A stepped mounting pad 160 is formed with corresponding apertures 162 and 164 formed on each step.

The two channels 124, 156 respectively formed within the two housing sections 100, 102 are opposing each other and are so formed that the spacer walls respectively defining these channels will also form an abutting relationship with each other. Accordingly, the spacer walls 120, 122 extending past the semicircular outer wall 104 of the housing section 100 so that they can mate with the recessed spacer walls 152, 154 in the section 102. The two channels will thereby be in communication with each other.

In the housing section 104, it will be noted that at the lower portion thereof there if formed an L-shaped baffle wall including the upper wall section 166 and the side wall section 168. The side wall section 168 lies along the same plane and is commensurate with the spacer wall 120 thereabove. The spacer wall 122 continues downwardly to form a side of a housing defined by the baffle walls 166, 168, the lower part of the spacer wall 122 and the bottom section 108. These four walls form an internal chamber 184 for receiving therein an illuminating bulb 170. An aperture 172 is formed in the outer wall 104 of the housing section 100, as shown in FIG. 5, to permit viewing of the illuminating bulb. A bezel 174 can be placed in the aperture 172 and a diffusing plate 176, such as a piece of translucent glass or plastic, can be placed within the bezel, as shown in FIGS. 2 and 5.

A resistor 178 is placed in series with the illuminating bulb 170 and the two lead wires 180, 182 extending therefrom. The wires 180, 182 downwardly depend from the internal chamber 184. These wires 180, 182 pass through the guideway formed between the posts 138 and 144 on the one side, as well as the guideway formed on the other side of the post 144.

A transverse baffle plate 188 is formed in the housing section 102 with a notch 186 in the front face thereof. The plate 188 is opposed to the chamber 184 so that the notch 186 can serve to support the indicator bulb 170 and maintain it in place.

The bimetallic switch is formed of a fixed contact member 190 and a corresponding adjustable contact member 192. Each contact member includes the respective contact points 194, 196 which are spaced to engage each other when contact is made. The fixed contact member 190 has an aperture 198 at its lower end and is positioned on the outward side of the mounting block 128. It is spaced within the channel 124 provided between the spacer walls 120, 122. Because of the aperture 126 formed in the outer wall 104 adjacent this channel, the fixed contact member can be affected by the temperature of the surrounding water.

Rivet 200 is utilized for the purpose of connecting the fixed contact member 190 within its channel. At the same time, the rivet 200 also interconnects the terminal lug 202 of the lead wire 204. It also serves to contact the loop terminal 206 of the capacitor 208 and make electrical contact therewith.

Initially, the lead wire 204 passes downward into the control chassis through the notch 148 in the top flange 114, then along the guideway provided on the lateral side of the spacer wall 122, and is then bent inwardly through the space 152 to be in position for mounting onto the mounting pad 128. The capacitor is maintained in the space between the mounting pads 128 and 132 on the one hand, and between the two spacer walls 120, 122 on the other hand.

The adjustable contact member 192 is maintained within the channel 156 in the other housing section. Its lower end has a vertical section 210 having two apertures 212 and 214 which align with the apertures 162, 164 of the mounting pad 160. The adjustable contact member 192 is connected on the outer side of the mounting pad, and fits within the channel, as shown in FIGS. 5 and 6. The aperture 158 provided in the outer wall 106 which gives access to the channel 156 also permits the adjustable contact member to be affected by the temperature of the aquarium water.

A first rivet 216 is utilized in conjunction with the lower aperture 164 and simultaneously serves to clamp the other looped contact 218 of the capacitor as well as the terminal lug 220 of the lead wire 222. A further rivet 224 (FIG. 5) is utilized for passing through the aperture 134 in the mounting block 132 and into the aperture 162 in the mounting block 160 for securely holding together the two opposing sections of the housing. The lead wire 222 passes through the space 150 and then downwardly through the guideway provided between the wall 122 and guidepost 226, downward through the notch 146 and the adjacent guideposts and then below the control chassis.

The lead wires 222 and 142 downwardly depending from the bottom wall of the control chassis, together with the lead wires 180 and 182 from the illuminating means, are connected in parallel and are placed within the terminal jacks 228, 230. The terminal jacks pass downwardly and are inserted into the sockets 232, 234 which are connected to the core 236 of the heating element 24. A resistance heating wire 238 is coiled around the core to form the appropriate heating element, as is well known in the art.

The electrical circuit showing the connections heretofore described is schematically shown in FIG. 7. It will be appreciated that the bimetallic contact switch having the members 190, 192 has placed across it the capacitor 208 for preventing arcing and accordingly avoiding pitting of the contact points on the contact members. This combination is placed in series with the heater coil 24. Placed in parallel across the heater coil is the series combination of the illuminating bulb 170 and the resistor 178.

Adjustment of the temperature setting is achieved by means of a unique sliding arrangement shown best in FIGS. 5 and 6. Formed in the upper part of the channel 156 of the housing section 102 is a passageway. The cross bars 240 and the cross plate 242 define the front portion of this passageway. Within the passageway there is provided the sliding actuating arm 244 having an upper curved cam follower surface 246, as shown in FIG. 1.

The cam surface which operates the actuating arm 244 is formed on the underside of the cap 16. Specifically, it comprises the flat circular surface 247 which is angularly positioned on the underside of the cap 16. This is achieved by means of the depending walls 248 and 250 with one of the walls 248 being longer than the other wall. As a result, the flat surface 247 is positioned with one end disposed lower than its diametrically opposed other end. The cam surface 247 serves to convert rotating motion of the cap into longitudinal motion for movement of the actuating arm 244.

The adjustable contact member 192 is formed with a plurality of sections, including the first angular section 251 upwardly extending from the vertical mounting section 210. There is then provided the longitudinal section 252 followed by a V-shaped section having a lower arm portion 254 continuing with the upper arm portion 256 and terminating with the upward longitduinal section 258. The contact point 196 is formed on the uppermost section 258. The shape of the adjustable contact member is such as to provide a leaf spring action which biases the sliding member 244 into an upward position.

The operation of the adjusting means can best be explained with relationship to FIGS. 5 and 6. In FIG. 5 it will be noted that the cam surface 247 is adjusted so that its dwell, or lowermost portion is against the cam follower edge 246 of the actuating arm 244. Accordingly, the forward arm portion 256 of the V-shaped section of the adjustable contact member 192 biases the actuating arm 244 into its uppermost position, whereby the adjustable contact member is at its rightmost position, with its contact point 196 being spaced apart from the contact point 194 on the fixed contact member 190.

As the knob 16 is rotated, the cam surface 247 rotates such that a lower part of the cam moves into contact with the cam follower 246 and lowers the actuating arm 244 to its lowermost position, as shown in FIG. 6. The lower end of the actuating arm 244 bears against the arm postion 256 of the V-shaped section of the adjustable contact member 192 so as to push it into a downward position as shown in FIG. 6. With the movement of the arm portion 256 downward, the upper section 258 moves to the left towards the contact point 194 and into engagement with it, and continues to move along and push the contact point 194 until the fixed contact 190 is in a slightly bent position, as shown in FIG. 6.

Depending upon the initial positioning between the adjustable and fixed contact members, the appropriate temperature setting will be achieved. The further the contact members are moved to the left, as shown in FIG. 6, the higher the temperature required to open the contacts and shut off the heating element of the heater. The less initial contact between the members, as in FIG. 5, the smaller the temperature needed to separate the contacts and shut off the heating element of the heater. Accordingly, by rotating the upper knob, the proper contact can be achieved and the proper temperature setting adjusted to maintain the temperature level of the heater as close as possible to a desired value.

It will be appreciated that by means of the knob and sliding actuating arm arrangement, a cyclical control is achieved so that after a crest in the cam is achieved, it begins to approach a dwell portion, and then continues again towards a crest. As a result, if the cam gets stuck in one of its maximum positions, only a slight movement will move it off the maximum onto a lesser position. This then provides a safety feature to avoid problems in the adjustment. Furthermore, the arrangement by means of a sliding arm avoids the need of a screw which has a tendency of wearing down, getting stuck, and providing difficulty in utilization.

The upper edge of the control chassis extends above the open end of the tube and extends transversely outwardly therefrom. This end extends into the housing and is held in place by means of a step portion internally formed on the upstanding side wall 34 which forms a seat receiving the top wall of the chassis. A downwardly depending rib 260, as shown in FIG. 6, extending below the outer flange 76 of the cap, maintains the control chassis in its downward position. At the same time, this annular rib permits rotation of the cap thereon.

It is appreciated that by means of the control chassis all of the control elements of the thermostatic circuit are maintained securely in place and will not move about or become jarred during operation.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium heater comprising a housing and a tube depending therefrom, an electrical heating element disposed in a bottom portion of said tube and a thermostatic control chassis disposed in an upper portion of said tube, said control chassis comprising opposing housing sections matingly engaged in nesting relationship to provide a cylindrical housing unit having an outer wall snugly fitting within said tube, a base wall transversely separating the bottom portion of said tube therefrom, and a transverse top wall, means for securely retaining said housing sections together, bimetallic thermostatic switch means securely mounted within said cylindrical housing unit in circuit with said heating element, and adjustment means on said housing for adjusting the position of said switch means to thereby control temperature setting of the heater.

2. An aquarium heater as in claim 1, wherein said bimetallic switch means comprises a fixed contact member and an adjustable contact member, a pair of inwardly directed longitudinally extending spacer walls provided in each housing section, each pair of spacer walls respectively defining therebetween a channel for receiving a respective one of said contact members, said channels being in opposition to each other to permit relative movement of said contact members into the opposing channel and fastening means at lower ends of each contact member for coupling each contact member in its respective channel in a caltilevered arrangement.

3. An aquarium heater as in claim 2, wherein said fastening means comprises mounting blocks provided in said channels, and rivet means passing through said mounting blocks.

4. An aquarium heater as in claim 2, and further comprising capacitor means interconnected between said fastening means and contained within one of said housing sections.

5. An aquarium heater as in claim 2, and further comprising internally directed baffle walls provided within one of said housing sections for defining an internal chamber, an aperture provided on the outer wall of said housing section for exposing said internal chamber, and an indicating means located in said internal chamber and electrically connected across said heating element.

6. An aquarium heater as in claim 5, and further comprising an indicator cover positioned within said aperture and permitting light transmission therethrough from said indicating means.

7. An aquarium heater as in claim 5, and further comprising a tranverse wall provided in the other of said housing sections in opposition to said internal chamber, and a notch provided in said transverse wall to retain said indicating means in place.

8. An aquarium heater as in claim 2, and further comprising openings in the outer wall of said housing section corresponding to the channels respectively provided therein to thereby permit the contact members to be affected by the temperature of the aquarium environment.

9. An aquarium heater as in claim 2, and further comprising vertical guideways on either side of the spacer walls of at least one housing section for accommodating therein passage of the lead wires through the housing section, openings in said base wall and said transverse top wall in registration with said guideways for accommodating entry and exit of the lead wires to and from the control chassis, and spaces provided in said spacer walls for permitting directing of the lead wires to the contact members.

10. An aquarium heater as in claim 2, wherein said tube has a closed bottom and an open top end, and wherein said top wall extends outwardly of said open top end and upwardly into said housing, and further comprising clamping means within said housing for securely retaining said top wall in said housing.

11. An aquarium heater as in claim 2, wherein said adjustment means comprises a passageway provided at an upper end of the channel receiving said adjustable contact member, a vertically sliding actuator arm positioned in said passageway for bearing against said adjustable contact member to move it toward and away from the fixed contact member, and control means in said housing for vertically sliding said actuator arm thereby selecting the desired temperature setting.

* * * * *